Dec. 25, 1928.
L. R. BUSHYAGER
1,696,836
POWER TRANSMISSION
Filed Nov. 14, 1927    3 Sheets-Sheet 1
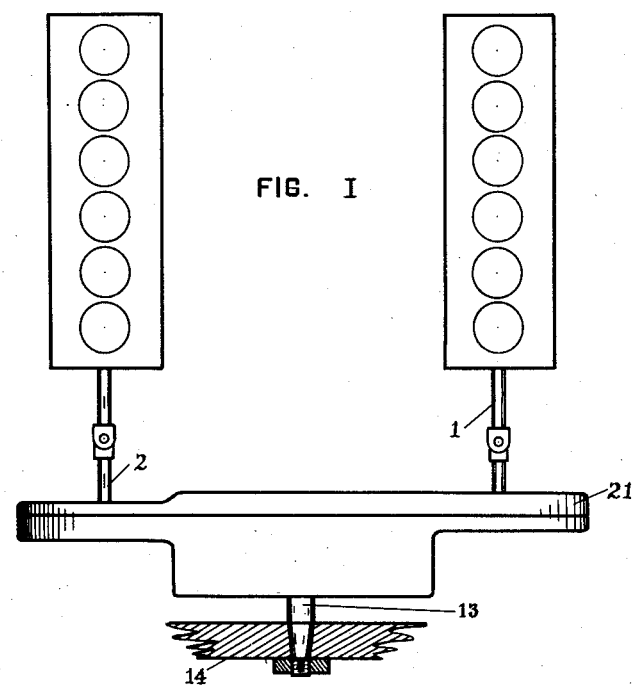
FIG. I
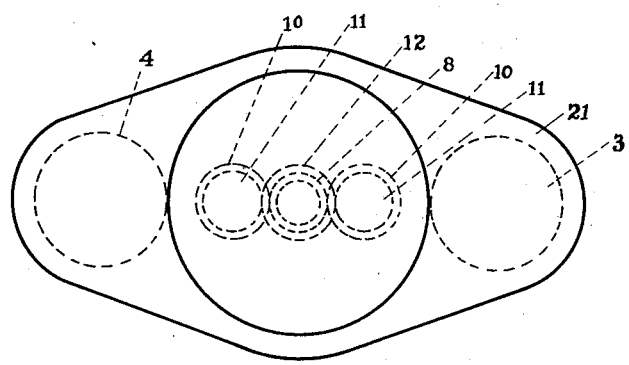
FIG. III
INVENTOR
Lee R. Bushyager
by Christy and Christy
his attorneys Dec. 25, 1928.
L. R. BUSHYAGER
1,696,836
POWER TRANSMISSION
Filed Nov. 14, 1927   3 Sheets-Sheet 2
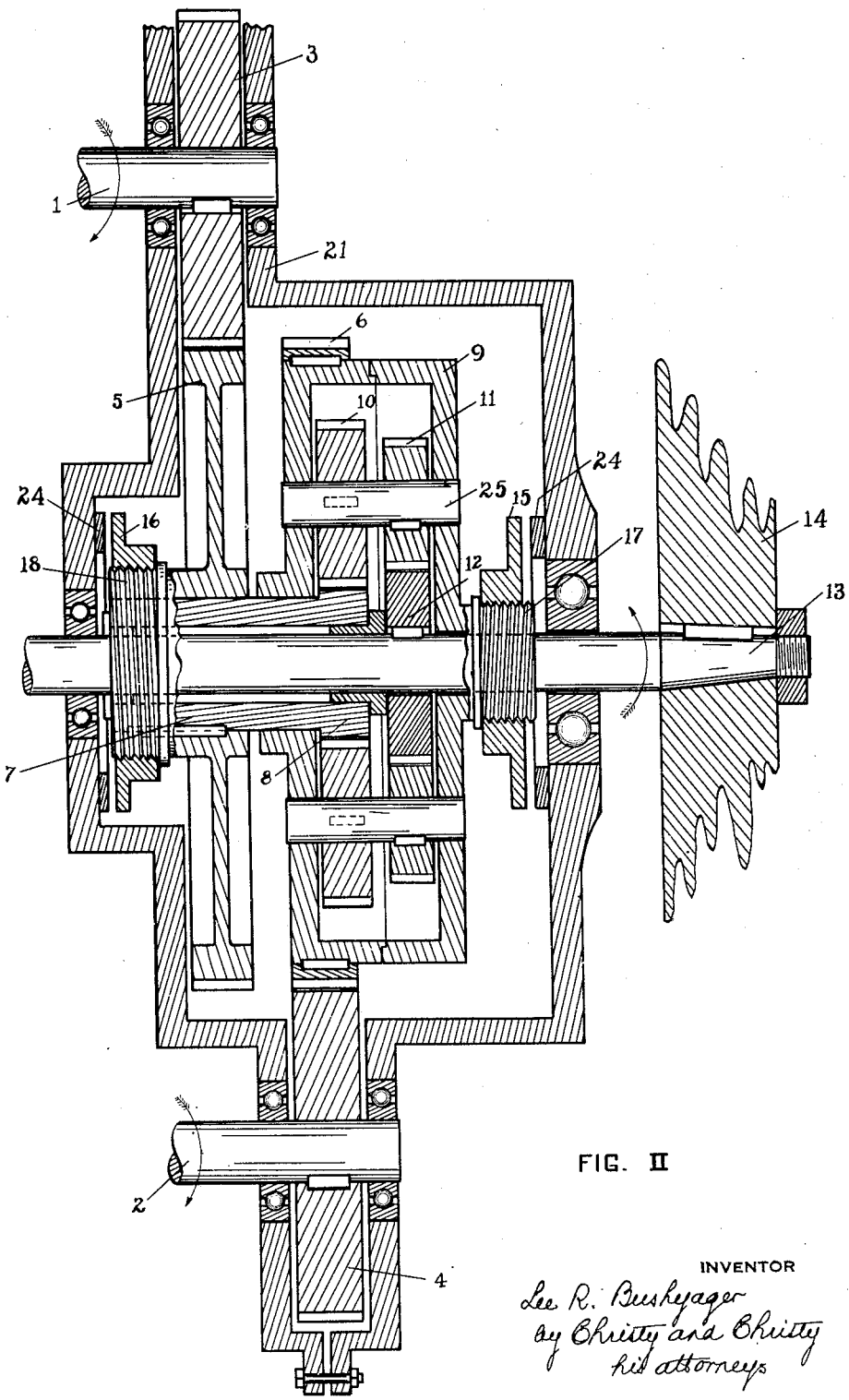
FIG. II
INVENTOR
Lee R. Bushyager
by Christy and Christy
his attorneys Dec. 25, 1928.　　　　　　　　　　　　　1,696,836
L. R. BUSHYAGER
POWER TRANSMISSION
Filed Nov. 14, 1927　　　　3 Sheets-Sheet 3
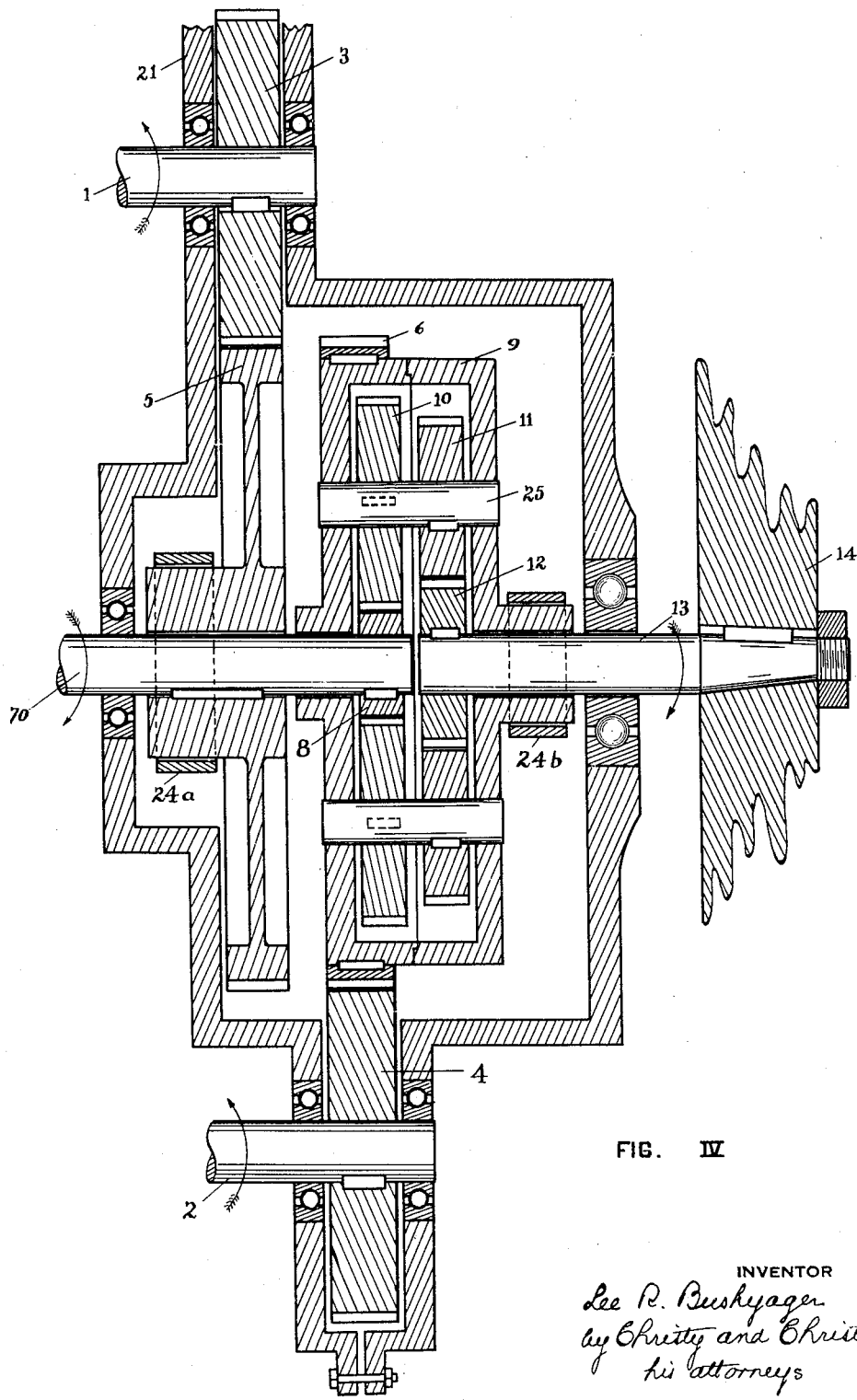
FIG. IV
INVENTOR
Lee R. Bushyager
by Christy and Christy
his attorneys Patented Dec. 25, 1928.

1,696,836

UNITED STATES PATENT OFFICE.

LEE R. BUSHYAGER, OF HASBROUCK HEIGHTS, NEW JERSEY.

POWER TRANSMISSION.

Application filed November 14, 1927. Serial No. 233,124.

My invention relates to improvements in power transmission, and consists in the assembly with a driven shaft of two prime movers so connected to the driven shaft that, being equal in power, they may exert equal and counterbalanced torques, or, alternatively, either alone may exert its driving torque, upon the driven shaft. The invention includes the further provision that when one prime mover alone is active, disconnection of the other is automatically assured.

In Fig. I of the accompanying drawings an assembly is diagrammatically shown in horizontal plan of a driven shaft, which in this case is shown to be the propeller shaft of an aeroplane, having associated with it two prime movers, in this case internal combustion engines, connected with it in the assembly which constitutes my invention. Fig. II is a view to larger scale, showing in horizontal and axial section the gearing whose position in the assembly is indicated in Fig. I. Fig. III is a phantom view of the gear case in end elevation. Fig. IV is a view corresponding to Fig. II and illustrating an alternative arrangement.

Referring first to Fig. I, the propeller shaft of an aeroplane is indicated at 13, and borne by the shaft the blades 14 of the propeller are fragmentarily indicated. Associated with and symmetrically arranged with respect to the shaft 13 are two internal combustion engines, indicated to be identical, whose shafts 1 and 2 enter the gear case 21 on either side of and at properly remote and in this instance equal distances from the axis of shaft 13.

Referring to Fig. II, the two shafts 1 and 2 are seen to carry integrally within gear case 21 the pinions 3 and 4.

The shaft 13 carries integrally a toothed wheel 12, and it carries rotatably a sleeve 7 and a cylindrical gear casing 9. The sleeve 7 extends through one head of the gear casing 9, so that the sleeve affords externally a cylindrical bearing surface upon which the gear casing is through one head rotatably mounted. The sleeve 7 externally of gear casing 9 carries integrally a spur wheel 5, and the gear casing 9 carries integrally a spur wheel 6. The two spur wheels 5 and 6 are in their toothed peripheries identical. With one of them the pinion 3 is in mesh, with the other the pinion 4.

The gear casing 9 carries rotatably mounted in its opposite heads a plurality of planetary gearing members each of which includes a shaft 25 bearing integrally two gear wheels; one of these, the gear wheel 10, meshes with a pinion 8 formed on sleeve 7, and the other, the gear wheel 11, meshes with toothed wheel 12. The intermeshed gear wheels 8 and 10 are equal in diameter; of the intermeshed gear wheels 11 and 12, the diameter of 11 is half that of 12. Manifestly the number of sets of planetary gears 10, 11 within gear case 9 may be increased indefinitely. They will however advantageously be arranged in diametrically opposite pairs. Fig. III indicates an adequate arrangement of two sets arranged in diametrical opposition.

Within the gear case 21 and adjacent its opposite heads the rotary parts carry two collars 15 and 16. The collar 15 is borne upon the hub 17 of gear case 9—that is to say, of spur wheel 6. The collar 16 is borne upon the hub 18 of spur wheel 5. The engagement of the two collars 15 and 16 upon the hubs is by oppositely turned screw threads, and the screw-thread engagement is a loose one. The casing 21 carries, opposite the two collars, brake rings 24. The collars 15 and 16 have a narrow range of axial movement to and from binding contact upon brake rings 24.

When either engine is operated alone and the shaft 1 (2) turns in the direction indicated by an arrow, Fig. II, the spur wheel 5 (6) is positively driven, and, because of the engagement of spur wheel 8 with gear wheel 10, the immediate effect is to cause the spur wheel 6 (5) to rotate in opposite direction. Such rotation of the two spur wheels causes the collars 15 and 16, because of inertia, to move by their screw-thread engagement, relatively to the hubs on which they are borne: one collar (16) moves away from, the other (15) to engagement with its brake ring 24. So engaging brake ring 24, the collar 15 (16) locks the spur wheel 6 (5) against continued rotation, and thereafter the continued rotation of spur wheel 5 (6) is effective to drive shaft 13. Rotation of spur wheel 5 effects rotation of spur wheel 8 with which it is integrated, and, gear case 9 being locked against turning, rotation of spur wheel 8 turns gear wheels 10 and 11 and so drives spur wheel 12, and with it shaft 13; rotation of spur wheel 6 effects rotation of gear case 9, and, spur wheel 8 being locked against turning, rotation of the gear case causes the contained planetary gearing in mesh both with the stationary spur wheel 8 and with the rotatable spur wheel 12, to rotate spur wheel 12, and with it shaft 13.

When both engines are in operation, so long as the shaft speeds are equal, neither can lock the collar 15, 16 of the other, and the torques of both shafts 1 and 2 are transmitted to shaft 13. Any inequality of speed, as between the shafts 1 and 2, expresses itself in a tendency to shift the load to the more rapidly turning shaft, and so to maintain equalization.

If, as has been noted of the apparatus shown, the planetary gear be so proportioned as to give a speed ratio as between either driving member 5 and 6 and the driven shaft, of 2:1, and if the pinions 3 and 4 be of half the diameter of spur wheels 5 and 6, then with either engine operating alone (the other being stationary) the speed ratio of engine shaft to propeller shaft will be 4:1, but if both engines be operating together, the speed ratio of engine shaft to propeller shaft will be 2:1. If, for example, the engine shaft be turning at 2800 R. P. M., if one engine be operating alone, the propeller shaft will turn at 700 R. P. M. But if both engines be in operation, the propeller shaft will turn at 1400 R. P. M.

Referring to Fig. IV which, in manner corresponding to Fig. II, illustrates another specific application of the invention in its broader aspects, there are incidental differences to be found, in that a shaft 70, coaxially mounted with and longitudinally aligned with shaft 13, takes the place of the sleeve 7 of Fig. II, and it is the toothed wheels 8 and 10 which in size bear ratio of 1:2, whereas it is the toothed wheels 11 and 12 which are equal in size. The notable difference, however, is that the spur wheels 5 and 6 are individually locked against turning and released, not automatically, but by means of brake bands 24ª and 24ᵇ, which may be understood to be capable of being tightened and released manually.

With the arrangement of Fig. IV, if one engine alone be in operation and it be desired to bring the other into united operation, the release of the brake band and the sudden throttling of the engine then in operation, will cause the propeller, which will continue to turn under its own momentum, to act as a starter for the other engine. And when the second engine has so been started, both may be continued in operation.

A number of advantages are to be gained in the practice of my invention. First and foremost, for any given engine there is an optimum speed, a speed at which the engine operates with greatest economy. It has been a difficulty, which my invention overcomes, of so combining two engines with one shaft that optimum engine speed may be maintained, whether the engines act singly or together in driving the shaft.

The two engine shafts are equidistant on opposite sides of the driven shaft, and the gear ratio is the same for both. When, therefore, the two engines are in simultaneous operation lateral thrusts, being substantially equal, are substantially balanced.

The shafts all extend in parallelism, the gears all are simple, connections all are direct. This makes for durability, efficiency, and economy.

In aeroplane building, the two engines may be contained in one housing, with corresponding saving in resistance to travel.

The regular, single-engine plane structure may be used, with the engines and the propeller mounted in the nose of the fuselage, with economy of space and with minimum resistance to travel.

I claim as my invention:

1. In combination with a driven shaft, two prime movers provided each with a power shaft, a collar threaded upon a member rotating in unison with each power shaft and movable by virtue of such threaded connection to and from an oppositely set, fixed abutment, and gearing connecting the two power shafts with the driven shaft.

2. In power transmitting apparatus a driven shaft bearing integrally a toothed wheel, two spur wheels of equal size rotatable coaxially with said driven shaft, two power shafts each provided with a pinion meshing one with each of the two spur wheels first named, one of the two spur wheels first named bearing integrally a gear case and the other bearing integrally a pinion arranged within the gear case, a planetary gearing member consisting of two gear wheels integrated on a common axle and rotatably borne in said gear case and meshing by means of its two gear wheels with the toothed wheel which is integral with the driven shaft and with the pinion which is integral with the other of the two spur wheels first named, and means for holding each of the spur wheels first named against rotation.

In testimony whereof I have hereunto set my hand.

LEE R. BUSHYAGER.